(12) United States Patent
Yasunaka et al.

(10) Patent No.: US 8,582,230 B2
(45) Date of Patent: Nov. 12, 2013

(54) HARD DISK DRIVE, METHOD FOR ESTIMATING BACK ELECTROMOTIVE FORCE, AND METHOD FOR CONTROLLING VELOCITY OF HEAD

(75) Inventors: Shigen Yasunaka, Kanagawa-ken (JP); Shinji Takakura, Kanagawa-ken (JP); Yoshiyuki Ishihara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 13/232,253

(22) Filed: Sep. 14, 2011

(65) Prior Publication Data
US 2012/0019955 A1    Jan. 26, 2012

(30) Foreign Application Priority Data

Mar. 30, 2011  (JP) ................................. 2011-076413

(51) Int. Cl.
   *G11B 21/02*    (2006.01)
(52) U.S. Cl.
   USPC ........................................................... 360/75
(58) Field of Classification Search
   USPC .................... 360/55, 75, 77.02, 78.07, 78.09
   See application file for complete search history.

(56) References Cited

U.S. PATENT DOCUMENTS 7,420,764 B2*  9/2008  Kim et al. ................... 360/77.02
2011/0019299 A1  1/2011  Yasunaka et al.

FOREIGN PATENT DOCUMENTS

JP    2005-293838    10/2005
JP    2011-028811    2/2011

* cited by examiner

*Primary Examiner* — Ali Neyzari
(74) *Attorney, Agent, or Firm* — Turocy & Watson, LLP (57) ABSTRACT

According to one embodiment, a hard disk drive includes a head, a voice coil motor, a driving circuit, an identification unit, a storage unit, and an estimation unit. The head is configured to perform write/read of information to a storage medium. The voice coil motor is configured to move the head. The driving circuit is configured to drive the voice coil motor, based on a command signal. The identification unit is configured to identify at least one parameter of a discrete-time model. The discrete-time model represents a transfer function from the command signal to a voltage drop quantity by an inductance of a coil of the voice coil motor. The storage unit is configured to store the parameter. The estimation unit is configured to estimate a back electromotive force of the coil, based on the discrete-time model including the parameter.

13 Claims, 7 Drawing Sheets

HARD DISK DRIVE, METHOD FOR ESTIMATING BACK ELECTROMOTIVE FORCE, AND METHOD FOR CONTROLLING VELOCITY OF HEAD

CROSS-REFERENCE TO RELATED APPLICATION

This application is based upon and claims the benefit of priority from Japanese Patent Application No. 2011-076413, filed on Mar. 30, 2011; the entire contents of which are incorporated herein by reference.

FIELD

Embodiments described herein relate generally to a hard disk drive, a method for estimating a back electromotive force, and a method for controlling a velocity of a head.

BACKGROUND

As to positioning control and velocity control of a head of a hard disk drive, a head-position error signal is used. The head-position error signal is acquired by regenerating servo information included in a servo sector on a disk. However, at a timing of unload operation, after the head is positioned into a ramp mechanism, the head-position error signal cannot be acquired.

Accordingly, at the timing of unload operation, in order to perform the velocity control of the head in the ramp mechanism, a velocity of the head is estimated from a back electromotive force occurred at a voice coil motor. By using this velocity, the velocity control of the head is performed.

However, in an equation to calculate the back electromotive force, an inductance-term of a coil is included. It is difficult to estimate the back electromotive force by considering influence of the inductance term. In exemplary technique, the inductance term is cancelled by lengthening a sampling period of a control input, and the back electromotive force is estimated.

Accordingly, as to above-mentioned estimation technique, in case of shortening the sampling period of the control input, the back electromotive force cannot be estimated with high accuracy.

DETAILED DESCRIPTION

In general, according to one embodiment, a hard disk drive includes a head, a voice coil motor, a driving circuit, an identification unit, a storage unit, and an estimation unit. The head is configured to perform write/read of information to a storage medium. The voice coil motor is configured to move the head. The driving circuit is configured to drive the voice coil motor, based on a command signal. The identification unit is configured to identify at least one parameter of a discrete-time model. The discrete-time model represents a transfer function from the command signal to a voltage drop quantity by an inductance of a coil of the voice coil motor. The storage unit is configured to store the parameter. The estimation unit is configured to estimate a back electromotive force of the coil, based on the discrete-time model including the parameter.

Various embodiments will be described hereinafter with reference to the accompanying drawings.

(The First Embodiment)

Figure 1:
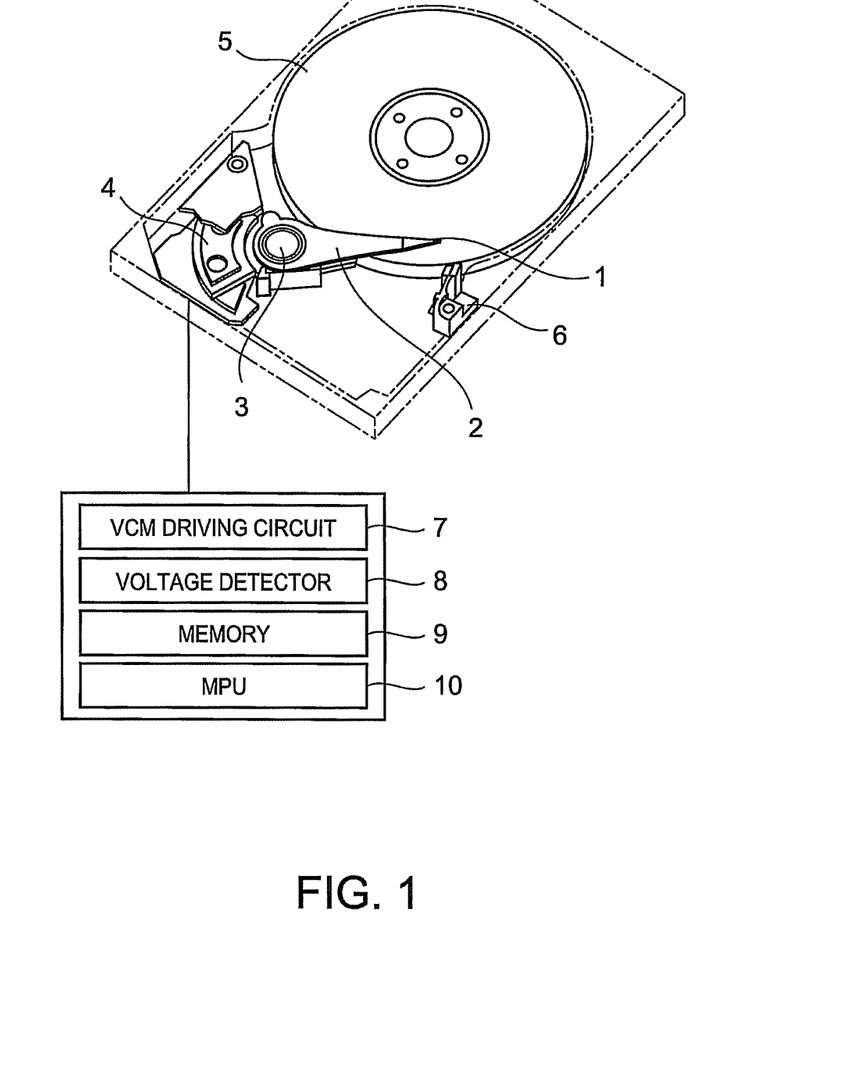
FIG. 1 is a schematic diagram of a hard disk drive according to first, second and third embodiments.
Figure 2:
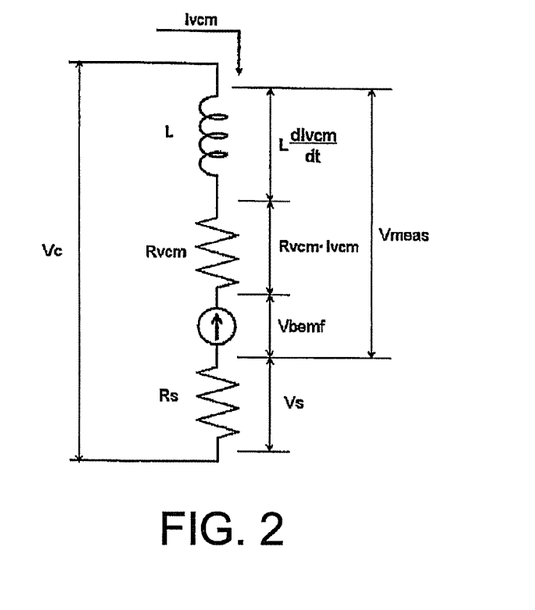
FIG. 2 is a schematic diagram of an equivalent circuit of a VCM (voice coil motor) in FIG. 1.

FIG. 1 is a schematic diagram of a hard disk drive according to the first embodiment. FIG. 2 is a schematic diagram of an equivalent circuit of a VCM (voice coil motor) of the hard disk drive.

In FIG. 1, the hard disk drive includes a head 1, an arm 2, a VCM 4, a VCM driving circuit 7, a voltage-detector 8, a memory 9 and a MPU 10. The head 1 reads/writes information from/to an information storage medium 5 such as a magnetic disk having a plurality of servo sectors. The arm 2 supports the head 1. The VCM 4 moves the arm 2. The VCM driving circuit 7 drives the VCM 4. The voltage-detector 8 detects a terminal voltage of a coil in the VCM 4. The MPU 10 performs positioning control and velocity control of the head 1 based on servo information magnetically recorded on the servo sectors of the information storage medium 5 (Hereinafter, it is called "a disk").

The head 1 is supported at an end of the arm 2. When the arm 2 is rotationally moved centering around a rotation axis 3 by the VCM 4, the head 1 is moving along a radius direction on the disk 5 being rotated by a spindle motor (not shown in FIG.). By this moving, seek operation and following operation are performed.

Briefly, the head 1 can write/read information at an arbitrary position on the disk 5. At this timing of regular seek/following operation, the MPU 10 performs positioning control of the head 1 by using a position error signal acquired from the servo information.

Furthermore, when a shock detection sensor (not shown in FIG.) detects a shock of the hard disk drive, or when a user turns off the power, by changing a control system from the positioning control to the velocity control, the MPU 10 performs an unload operation to save the head 1 into the ramp mechanism 6.

Conversely, when return (a load operation) from the unload operation is indicated, or when the user turns on the power, by performing the velocity control instead of the positioning control (at the timing of seek/following operation), the MPU 10 moves the head 1 from the ramp mechanism 6 onto the disk 5.

For example, the VCM 4 is a coil motor in which a magnet (fixed at a base) and a coil (equipped with the arm 2 pivoted) are oppositely disposed. By sending a (electric) current to the coil, the VCM 4 functions as an actuator to provide (drive) the arm 2 with a rotation power.

A model of the VCM 4 is represented by an equivalent circuit shown in FIG. 2. In FIG. 2, "L" is an inductance, "$R_{vcm}$" a coil resistance, and "$R_s$" is a sense resistance. Furthermore, "$V_{bemf}$" is a back electromotive force, "$I_{vcm}$" is a current (Hereinafter, it is called a coil current) flown into the coil, "$V_{meas}$" is a (detectable) terminal voltage of the coil, and "$V_c$" is a voltage between the coil and the sense resistance.

In any case of the positioning control and the velocity control, the VCM driving circuit 7 receives a command voltage from the MPU 10, and drives the arm 2 by flowing the coil current $I_{vcm}$ to the coil.

In this case, the VCM driving circuit 7 includes an ADC circuit (including a low-pass filter (LPF)) and a current feedback circuit. In above explanation, the VCM 4 is another component from the VCM driving circuit 7. However, actually, the VCM driving circuit 7 and the VCM 4 are connected. Accordingly, a coil of the VCM 4 may be included in a part of the VCM driving circuit 7.

The voltage detector 8 detects the terminal voltage $V_{meas}$ of the coil at estimation timing of back electromotive force (explained afterwards). In above explanation, the voltage detector 8 is one component. However, it may be set as a part of the VCM driving circuit 7.

Next, by referring to FIGS. 3~8, system component and operation of the MPU 10 of the hard disk drive are explained. In general, as to velocity control of the head 1 at a timing of load/unload operation, as mentioned-above, a back electromotive force of the coli in the VCM 4 is used.

In a model of VCM 4 shown as the equivalent circuit of FIG. 2, the back electromotive force $V_{bemf}$ occurred at the coil is represented as following equation.

$$Vbemf = Vmeas - R \cdot Ivcm - L \cdot \frac{dIvcm}{dt} \qquad [\text{Eq. 1}]$$

The back electromotive force $V_{bemf}$ is in proportion to a head-velocity $V_{el}$. Accordingly, by using a torque constant $K_t$ and the Eq.1, the head-velocity $V_{el}$ is represented as following equation.

$$Vel = \frac{\left(Vmeas - R \cdot Ivcm - L \cdot \frac{dIvcm}{dt}\right)}{Kt} \qquad [\text{Eq. 2}]$$

In this case, under a condition that a current feedback is sufficiently effective, a coil current $I_{vcm}$ is in proportion to a command voltage $V_{cmout}$ (control input). This relationship is represented as "$I_{vcm} = \alpha \cdot V_{cmout}$" by using a proportion constant $\alpha$. Accordingly, the Eq.2 is replaced with following equation.

$$Vel = \frac{\left(Vmeas - R \cdot \alpha \cdot Vcmout - L \cdot \alpha \cdot \frac{dVcmout}{dt}\right)}{Kt} \qquad [\text{Eq. 3}]$$

In conventional technique, a third term (inductance term) of a right side in the Eq.3 is cancelled by lengthening a sampling period to a degree that a transient response (occurred by time change of the command voltage $V_{cmout}$) of the inductance term sufficiently damps, or by setting the command voltage $V_{cmout}$ to a constant value.

Accordingly, in case of shortening the sampling period of the command voltage $V_{cmout}$, influence of the inductance term in the Eq.2 needs to be taken into consideration. As a result, estimation of a correct head-velocity (back electromotive force) is difficult.

Accordingly, in the first embodiment, while the head 1 is positioning on the disk 5, by using a model of the VCM 4 and the VCM driving circuit 7 in a discrete-time system, the MPU 10 identifies unknown parameter (For example, parameter including inductance L) of this model. Then, for example, at a timing of unload operation, the MPU 10 estimates a back electromotive force by the model (digital filter) represented using this unknown parameter (identified). Furthermore, the MPU 10 performs velocity control of the head 1 by the back electromotive force (estimated).

The model of the VCM 4 and the VCM driving circuit 7 is explained. First, a transfer function of which input is the command voltage $V_{cmout}$ and output is the terminal voltage $V_{meas}$ is represented as following equation.

$$\frac{Vmeas(s)}{Vcmout(s)} = \left(Ls + R + \frac{Kt^2}{J} \cdot \frac{1}{s}\right)\frac{1}{as+1} \cdot \frac{1}{bs+1} \cdot \frac{C_{fbg} f_{cfb}}{s + f_{cfb}} \qquad [\text{Eq. 4}]$$

In the Eq.4, "$K_t$" is torque constant, "J" is inertial moment, "a" and "b" are constants of LPF of ADC output, "$f_{cfb}$" is cutoff frequency in case of approximating a current feedback to time-lag of first order, and "$c_{fbg}$" is a gain of the current feedback. Furthermore, "L" is an inductance of a coil, and "R" is a resistance of the coli.

In case of adding a step input having magnitude g as the command voltage $V_{cmout}$, a response (terminal voltage) is represented as following equation, by setting $V_{cmout}$ of the Eq.4 to g/s.

$$Vmeas(s) = \left(Ls + R + \frac{Kt^2}{J} \cdot \frac{1}{s}\right) \cdot \frac{1}{as+1} \cdot \frac{1}{bs+1} \cdot \frac{C_{fbg} f_{cfb}}{s + f_{cfb}} \cdot \frac{g}{s} \qquad [\text{Eq. 5}]$$

The Eq.5 is transformed onto a time domain by the inverse Laplace transform. Among LPF of ADC output and the current feedback, a transient response of LPF having high cutoff frequency damps in a short time. Accordingly, this response can be disregarded.

Assume that a filter having low cutoff frequency is $1/(as+1)$. In case that other two filters have sufficient high cutoff frequency respectively, a terminal voltage $V_{meas}$ of a coil at time t passed from a timing when the command voltage was added is represented as following equation.

$$Vmeas(t) = \left(G_L e^{-\frac{t}{a}} + G_K t + G_R\right) \cdot g \qquad [\text{Eq. 6}]$$

Moreover, in case that cutoff frequency of filters except for $1/(as+1)$ is low, "a" in the Eq.6 can be replaced as "a=b" or "$a=1/f_{cfb}$".

Furthermore, the Eq.6 represents a response for a single command voltage. However, in actual discrete-time system, this command voltage is regarded to be continuously input.

Figure 3:
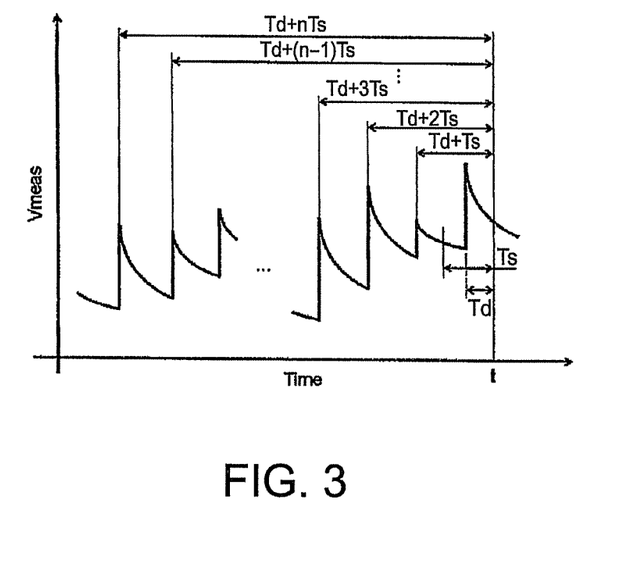
FIG. 3 is a graph showing a time response of a terminal voltage of a coil.

Accordingly, as shown in FIG. 3, assume that the sampling period is $T_s$ and delay from an input timing of the command voltage to a detection timing thereof is $T_d$. As to a step input having magnitude $g_n=g(iT_s-T_d-nT_s)$ inputted before $T_d+nT_s$ (n=1, 2, . . . ) from the present time $iT_s$, the terminal voltage at the present time $iT_s$ is represented as following equation.

$$Vmeas_k[i] = \left\{ G_L e^{-\frac{Id+nTs}{a}} + G_K(Td+nTs) + G_R \right\} \cdot g_n \quad [\text{Eq. 7}]$$

As to the step input before $T_d+nT_s$, a response is linear at the present time $iT_s$. Accordingly, the terminal voltage at the present time $iT_s$ is represented as following equation, by a sum of past responses.

$$Vmeas[i] = \sum_{k=0}^{\infty} Vmeas_k[i] \quad [\text{Eq. 8}]$$

$$= G_L e^{-\frac{Td}{a}} \sum_{k=0}^{n} g_k e^{\frac{Ts}{a}k} + G_K \sum_{k=0}^{n} g_k(Td+kTs) + G_R \sum_{k=0}^{n} g_k$$

In the Eq.8, a second term of a right side is time-integration of the step input, i.e., in proportion to a head-velocity. A third term of the right side is a sum of the step input, i.e., the command voltage itself. Accordingly, the Eq.8 is replaced with following equation.

$$Vmeas[i] = G_L e^{-\frac{Td}{a}} \sum_{k=0}^{n} g_k e^{-\frac{Ts}{a}k} + G_K Vel[i] + G_R Vcmout[i] \quad [\text{Eq. 9}]$$

Figure 4:
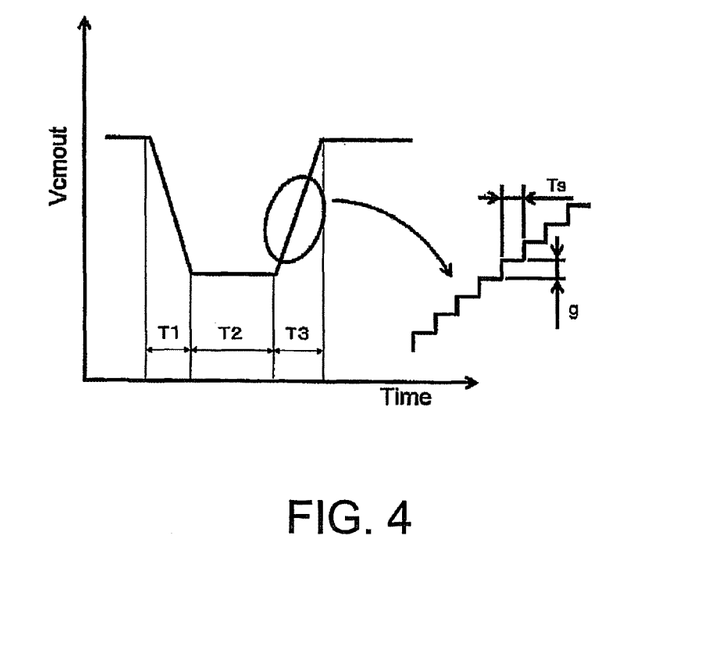
FIG. 4 is a graph showing an example of a waveform of a command voltage.

FIG. 4 shows one example of waveform of the command voltage $V_{cmout}$ to be supplied to the VCM driving circuit 7, when the head 1 is entering into the ramp mechanism at a timing of unload operation. When the head 1 is driven onto the ramp mechanism 6, a velocity of the head 1 is dropped once (T1). After that, the head 1 is moving toward a stopper with a constant velocity (T2). Then, after reaching the stopper, under a status that the head 1 is pressed against the stopper, the command voltage is supplied (T3).

In this case, as shown in enlarged part of waveform of FIG. 4, assume that the command voltage every sampling period is changed by a fixed magnitude g at a fixed sampling period $T_s$. In this case, the Eq.9 is further replaced with following equation.

$$Vmeas[i] = G_L e^{\frac{Td}{a}} g \sum_{k=0}^{n} e^{-\frac{Ts}{a}k} + G_K Vel[i] + G_R Vcmout[i] \frac{d\square}{d\square} \quad [\text{Eq. 10}]$$

In the Eq.10, $G_L$ is an inductance "L" multiplied with a coefficient. The inductance term is summed up to a first term of the Eq.10. Accordingly, by extracting a voltage drop quantity of the inductance from the terminal voltage $V_{meas}$ in the Eq.10, following equation is acquired.

$$Vmeas_L[i] = G_L e^{-\frac{Td}{a}} g \sum_{k=0}^{n} e^{-\frac{Ts}{a}k} \quad [\text{Eq. 11}]$$

In the Eq.11, following condition is acquired.

$$e^{-\frac{Ts}{a}} < 1 \quad [\text{Eq. 12}]$$

Briefly, by setting "n" to a sufficient large value, a range of degree larger than or equal to "n" is regarded as "0". Accordingly, the Eq.11 is replaced with following equation when the command voltage every sampling period is changed by a time variable magnitude $g_n$.

$$Vmeas_L[i] = G_L \begin{pmatrix} e^{-\frac{Td}{n}} \cdot g(t-Td) + \\ e^{-\frac{Td+Ts}{n}} \cdot g(t-Td-Ts) + \\ e^{-\frac{Td+2Ts}{n}} \cdot g(t-Td-2Ts) + \ldots + \\ e^{-\frac{Td+nTs}{n}} \cdot g(t-Td-nTs) \end{pmatrix} \quad [\text{Eq. 13}]$$

$$= G_L \begin{pmatrix} e^{-\frac{Td}{n}} + e^{-\frac{Td+Ts}{n}} \cdot \frac{1}{z} + \\ e^{-\frac{Td+2Ts}{n}} \cdot \frac{1}{z^2} + \ldots + e^{-\frac{Td+nTs}{n}} \cdot \frac{1}{z^n} \end{pmatrix} \cdot$$

$$g(t-Td)$$

$$= G_L \left( \frac{\begin{matrix} e^{-\frac{Td}{n}} \cdot z^n + e^{-\frac{Td+Ts}{n}} \cdot z^{n-1} + \\ e^{-\frac{Td+2Ts}{n}} \cdot z^{n-2} + \ldots + \\ e^{-\frac{Td+nTs}{n}} \end{matrix}}{z^n} \right) \cdot$$

$$\frac{z-1}{z} Vcmout[i]$$

Moreover, in the Eq.13, "1/z" is regarded as an operator to delay data by one sample.

$$Vmeas_L[i] = G_L \cdot L(z) \cdot Vcmout[i] \quad [\text{Eq. 14}]$$

$$L(z) = \frac{e^{-\frac{Td}{n}} \cdot Z^{n+1} + \left(e^{-\frac{Td+Ts}{n}} - e^{-\frac{Td}{n}}\right) \cdot Z^{n-1} + \left(e^{-\frac{Td+2Ts}{n}} - e^{-\frac{Td+Ts}{n}}\right) \cdot Z^{n-2} + \ldots + \left(e^{-\frac{Td+nTs}{n}} - e^{-\frac{Td+(n-1)Ts}{n}}\right) \cdot Z - e^{-\frac{Td+nTs}{n}}}{Z^{n+1}}$$

In the first embodiment, as shown in the Eq.14, a transfer function $G_L \cdot L(z)$ of which input is the command voltage $V_{cmout}$ and output is the voltage drop quantity of the inductance is defined as a discrete-time model.

Figure 5:
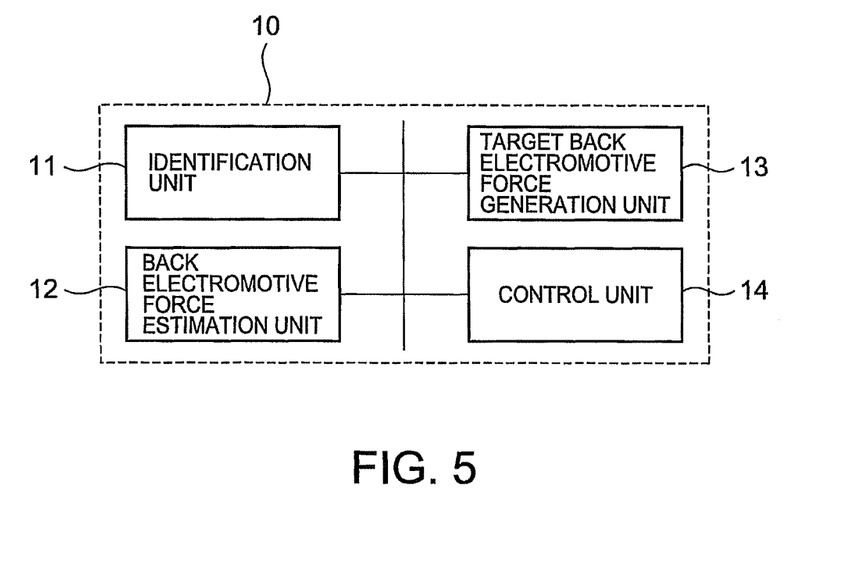
FIG. 5 is a block diagram of a MPU in FIG. 1.

FIG. 5 is a system component of the MPU 10. The MPU 10 includes an identification unit 11, a back electromotive force estimation unit 12, a target back electromotive force generation unit 13, and a control unit 14. The identification unit 11 identifies a parameter of the discrete-time model. The back electromotive force estimation unit 12 estimates a back electromotive force of a coil. The target back electromotive force generation unit 13 generates a target back electromotive force. The control unit 14 calculates a command voltage to perform velocity control of the head 1, and outputs the command voltage to the VCM driving circuit 7.

Under a status that the head 1 is positioned inside the ramp mechanism 6, for example, before load operation, a velocity of the head 1 is set to "0" by pressing the arm 2 against the stopper (not shown in FIG.), and the identification unit 11 identifies a parameter of the discrete-time model. Moreover, in the first embodiment, a sampling period $T_s$, a delay time $T_d$, and a constant "a" of LPF, are processed as known values.

In the Eq.14, L(z) is a known value by determining with "$T_s$, $T_d$ and a". Here, a gain $G_L$ of inductance as unknown parameter is identified.

The voltage drop quantity $V_{measL}$ of inductance is represented as following equation, by the Eq.10 and Eq.11.

$$V\text{meas}_L[i] = V\text{meas}[i] - G_K V\text{el}[i] - G_R V\text{cmout}[i] \qquad [\text{Eq.15}]$$

In this case, while the arm 2 is pushed against the stopper in the ramp mechanism 6, a velocity of the head 1 is "0". Accordingly, the Eq.15 is replaced with following equation.

$$V\text{meas}_L[i] = V\text{meas}[i] - G_R V\text{cmout}[i] \qquad [\text{Eq.16}]$$

By the Eq.14 and Eq.16, the gain $G_L$ of inductance is represented as following equation.

$$G_L = \frac{V\text{meas}[i] - G_R V\text{cmout}[i]}{L(z) \cdot V\text{cmout}[i]} \qquad [\text{Eq. 17}]$$

When the command voltage $V_{cmout}$ is input, the identification unit 11 acquires the terminal voltage $V_{meas}$ detected by the voltage detector 8, and identifies the gain $G_L$ of inductance by applying the command voltage $V_{cmout}$ and the terminal voltage $V_{meas}$ to the Eq.17.

Moreover, in order to identify $G_L$, a gain $G_R$ of coil resistance needs to be known. In this case, before identifying $G_L$, for example, in a status that the arm 2 is pushed against the stopper, a fixed command voltage is applied. As a result, an inductance term is regarded as "0", and a velocity of the head 1 becomes "0". Accordingly, by following equation transformed from the Eq.17, $G_R$ is identified.

$$G_R = \frac{V\text{meas}[i]}{V\text{cmout}[i]} \qquad [\text{Eq. 18}]$$

In case of identifying above-mentioned $G_L$, while the arm 2 is pushed against the stopper, by averaging a plurality of $G_L$ acquired every sampling period or by adding another statistic processing, $G_L$ can be further correctly identified. This identified $G_L$ is temporarily stored into the memory 9.

Figure 6:
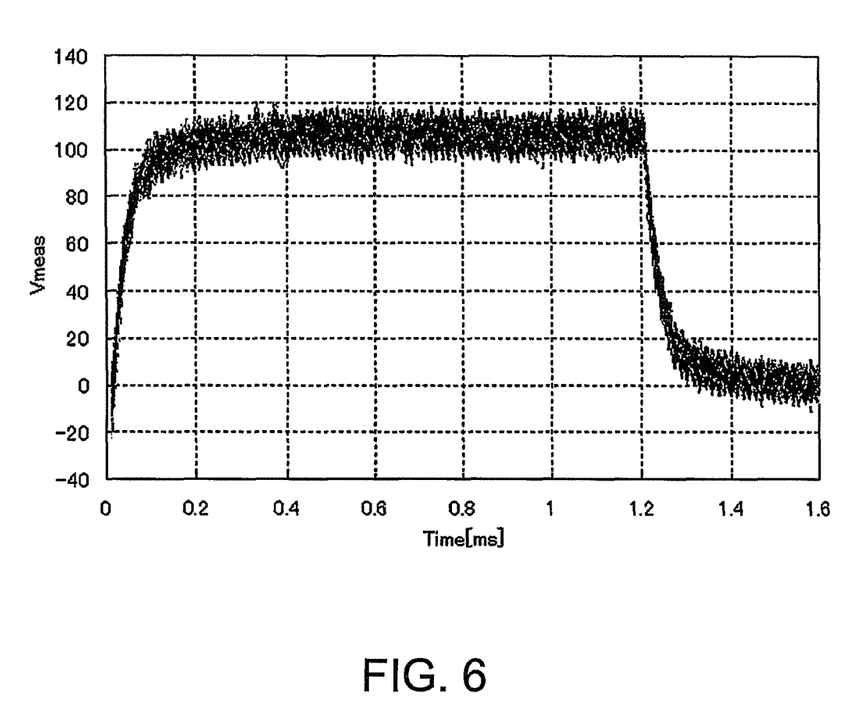
FIG. 6 is a graph showing a time response of a terminal voltage of a coil at gain-identification timing.

FIG. 6 shows the terminal voltage detected while the head is pushed against the stopper before load operation. In FIG. 6, a graph (black thick line) represents overlapped data (terminal voltage detected) by tests of one hundred times. After detecting several samples, the terminal voltage becomes a stationary state as a constant value.

Figure 7:
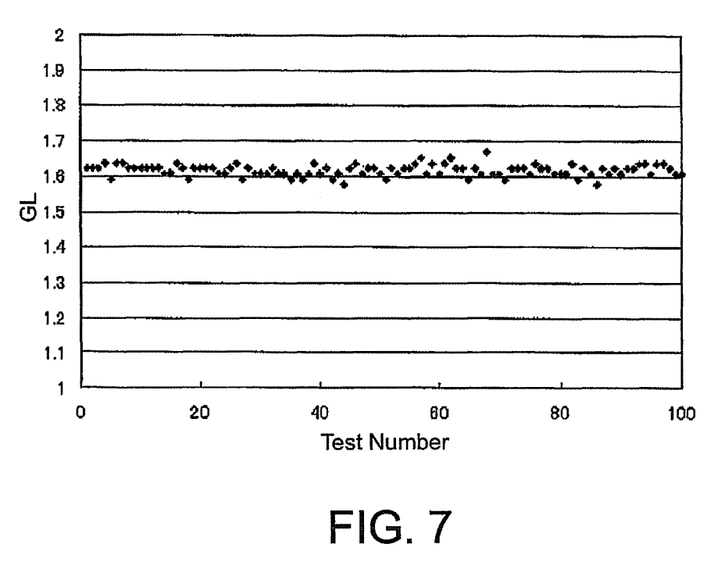
FIG. 7 is a graph showing a value of a gain identified.

FIG. 7 shows calculation result of $G_L$ by averaging data (terminal voltage) having the stationary state every test. As shown in FIG. 7, $G_L$, is approximately same value every test. Accordingly, $G_L$ can be stably identified.

In this way, identification of $G_L$ can be performed with on-board. Accordingly, even if the inductance changes during operation, the inductance term including influence of individual difference can be estimated.

For example, at a timing to acquire a velocity of the head 1 (For example, a timing of unload operation), the back electromotive force estimation unit 12 estimates a back electromotive force $V_{bemf}$ based on the identified $G_L$.

In this case, a second term of the right side in the Eq.10 represents the back electromotive force. By the Eq.10 and Eq.14, the back electromotive force $V_{bemf}$ is represented as following equation.

$$V\text{bemf}[i] = G_K V\text{el}[i] = V\text{meas}[i] - G_L L(z) \cdot V\text{cmout}[i] - G_R V\text{cmout}[i] \qquad [\text{Eq.19}]$$

According to the Eq.19, by subtracting a voltage drop quantity of inductance and a voltage drop quantity of coil from the terminal voltage $V_{meas}$ respectively, the back electromotive force estimation 12 estimates a back electromotive force $V_{bemf}$.

In this case, as the gain $G_L$, a value (identified by the identification unit 11) stored into the memory 9 is used. As the terminal voltage $V_{meas}$, a value actually detected by the voltage detector 8 is used.

Moreover, as a value of L(z), it may be previously calculated based on "$T_s$, $T_d$ and a", and stored into the memory 9. Alternatively, by storing "$T_s$, $T_d$ and a" into the memory 9, the value of L(z) may be calculated with on-board.

Next, velocity control of the head 1 using the back electromotive force (estimated by the back electromotive force estimation unit 12) is explained. As a timing to perform velocity control of the head 1, various timing such as load operation or unload operation is considered. Here, an example at a timing of unload operation is explained.

The target back electromotive force generation unit 13 generates a target velocity of the head 1 at a timing of unload operation, i.e., a target back electromotive force $V_{bemf0}$. In this case, as the target back electromotive force $V_{bemf0}$, the target back electromotive force 13 may generate a fixed value or a changeable value as time function. This value $V_{bemf0}$ is output to the control unit 14 explained afterwards.

The control unit 14 accepts the target back electromotive force $V_{bemf0}$ generated by the target back electromotive force generation unit 13. Furthermore, the control unit 14 accepts the back electromotive force $V_{bemf}$ (as a feedback signal) estimated by the back electromotive force estimation unit 12. Then, the control unit 14 calculates a difference ($V_{bemf0} - V_{bemf}$) between the target back electromotive force $V_{bemf0}$ and the estimated back electromotive force $V_{bemf}$, and calculates a command voltage $V_{cmout}$ by applying a conventional control rule to the difference.

The control unit 14 supplies the command voltage $V_{cmout}$ (as an control input) to the VCM driving circuit 7. By controlling a velocity of the head 1 along a direction that the difference is equal to zero, the VCM driving circuit 7 performs unload operation.

As to the hard disk drive of the first embodiment, the identification unit 11 identifies a gain $G_L$ related to the inductance, based on the discrete-time model. Accordingly, even if a sampling period shortens, the back electromotive force can be correctly estimated.

Furthermore, by controlling a velocity of the head 1 using this back electromotive force, operation of the head can be stably realized. Furthermore, by accelerating the sampling period, traceability of velocity-control of the head 1 can improve.

(The Second Embodiment)

Figure 8:
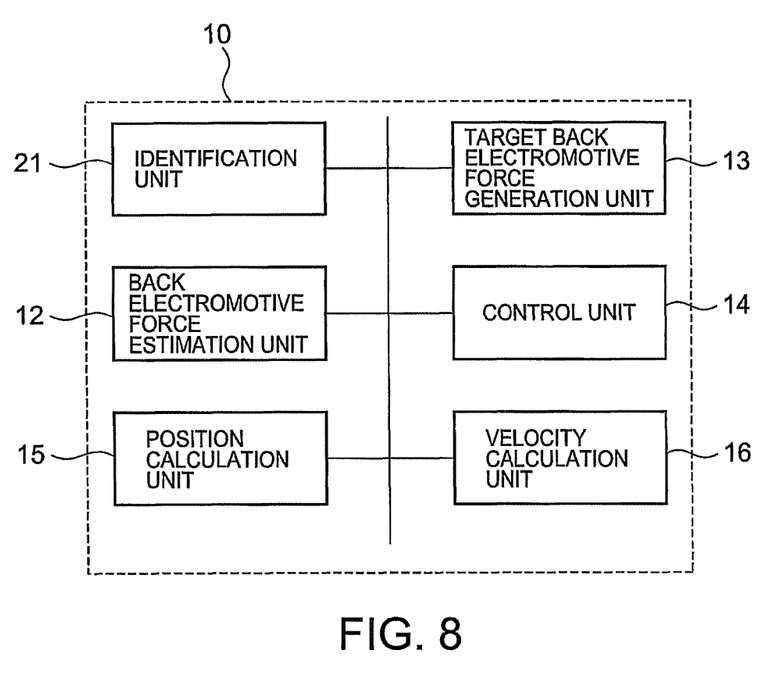
FIG. 8 is a block diagram of a MPU in a hard disk drive according to a second embodiment.

FIG. 8 shows a system component of the MPU 10 according to the second embodiment. In addition to a system component of the first embodiment, a position calculation unit 15 to calculate a position of the head 1, and a velocity calculation unit 16 to calculate a velocity of the head 1 using the position of the head 1, are included.

The position calculation unit 15 calculates a position signal of the head 1, based on a head-position error signal acquired by reproducing servo information (by the head 1) at a seek timing.

The velocity calculation unit 16 calculates a velocity signal $V_{el}$ of the head 1, for example, from a position signal calculated by the position calculation unit 15 and a position signal of one previous sample, during seek operation time.

In the second embodiment, by using data while the head 1 is operating on the disk 5, the identification unit 21 identifies a gain $G_L$ related to the inductance in the Eq.14. Following explanation represents an example to identify the gain $G_L$ while the head 1 is performing seek operation. Moreover, in the second embodiment, a sampling period "$T_s$", a delay "$T_d$", and a constant "a" of LPF, are known.

Here, in the same way as the first embodiment, following equation is acquired by solving the Eq.14 with a gain $G_L$ related to the inductance.

$$G_L = \frac{Vmeas_L[i]}{L(z) \cdot Vcmout[i]} \qquad [\text{Eq. 20}]$$
$$= \frac{Vmeas[i] - G_K Vel[i] - G_R Vcmout[i]}{L(z) \cdot Vcmout[i]}$$

In the second embodiment, according to the Eq.20, in case of supplying the command voltage $V_{cmout}$ at a seek timing, the identification unit 21 identifies a gain $G_L$ using a velocity signal $V_{el}$ of the head 1 (calculated by the velocity calculation unit 16) and a terminal voltage $V_{meas}$ of a coil (actually detected by the voltage detector 8). Moreover, as to the Eq.20, a gain $G_K$ of a torque constant and a gain $G_R$ of a coil resistance can be identified using a conventional technique (For example, JP-A 2011-28811).

Furthermore, a value of L(z) may be previously calculated based on "$T_s$", "$T_d$" and "a", and stored into the memory 9. Furthermore, by storing "$T_s$", "$T_d$" and "a" into the memory 9, the value of L(z) may be calculate with on-board.

Figure 9:
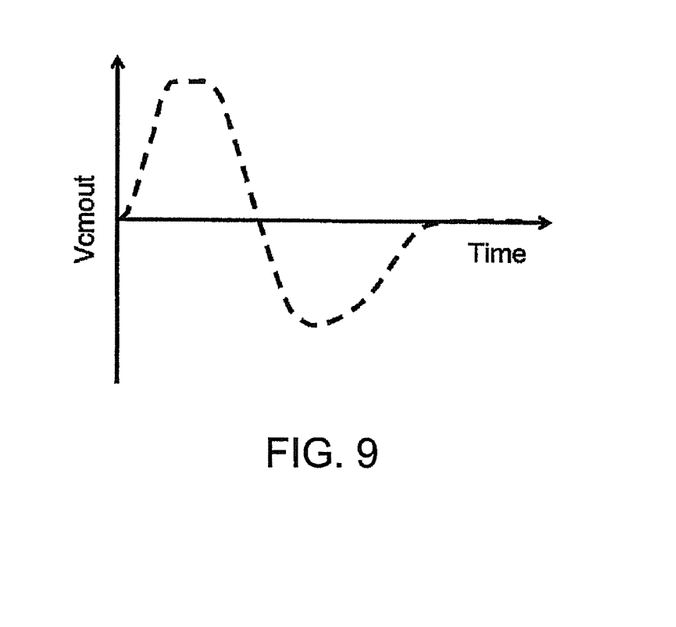
FIG. 9 is a graph showing a waveform of a command voltage at a seek timing.
Figure 10:
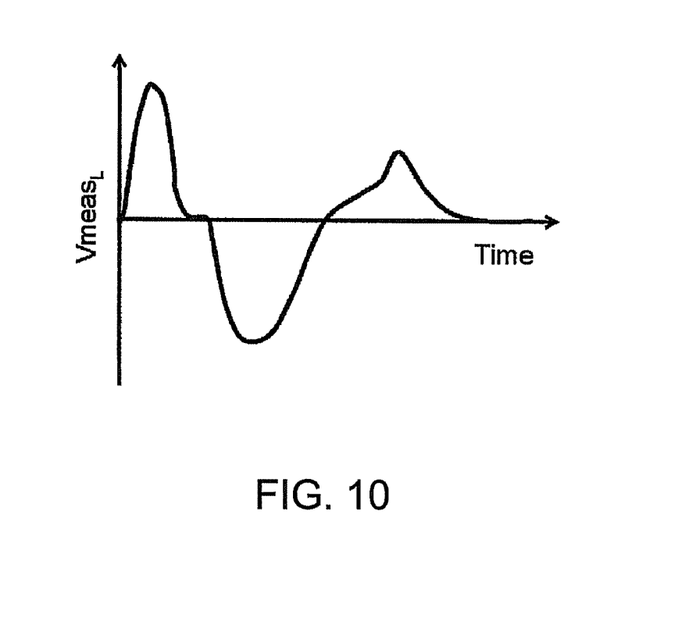
FIG. 10 is a graph showing a time response of a voltage drop quantity by an inductance at a seek timing.

FIG. 9 shows one example of a waveform of the command voltage $V_{cmout}$ at a seek timing, and FIG. 10 shows one example of a waveform of a voltage drop quantity $V_{measL}$ thereat. The identification unit 21 may detect data at a plurality of points of the waveform (FIG. 10), and identify an average of the data as a gain $G_L$. Furthermore, the identification unit 21 may identify the gain $G_L$ by applying the least square method to all data or partial data of the waveform.

Figure 11:
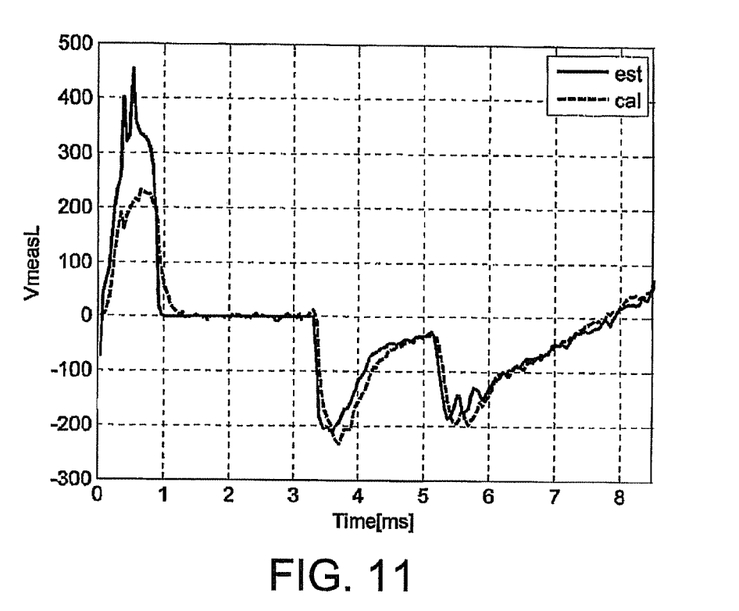
FIG. 11 is a graph showing a time response of a voltage drop quantity by an inductance identified.

FIG. 11 shows one example of the gain $G_L$ identified from the data at the seek timing. A broken line represents $V_{measL}$ (true value) calculated from a terminal voltage $V_{meas}$ of a coil, a head velocity $V_{el}$ and a command voltage $V_{cmout}$. A solid line represents $V_{measL}$ (estimation value) acquired as an output when the command voltage $V_{cmout}$ is input, by applying the identified $G_L$ to a discrete-time model of the Eq.14. In FIG. 11, at a start time of seek operation, the estimation value is larger than the true value. However, at a time except for the start time, the estimation value almost converges to the true value. Briefly, it is evident that the gain $G_L$ is correctly identified.

Accordingly, by using the gain $G_L$ identified (by the identification unit 21), the target back electromotive force estimation unit 12 can correctly estimate a back electromotive force $V_{bemf}$ by the Eq.19.

(The Third Embodiment)

Figure 12:
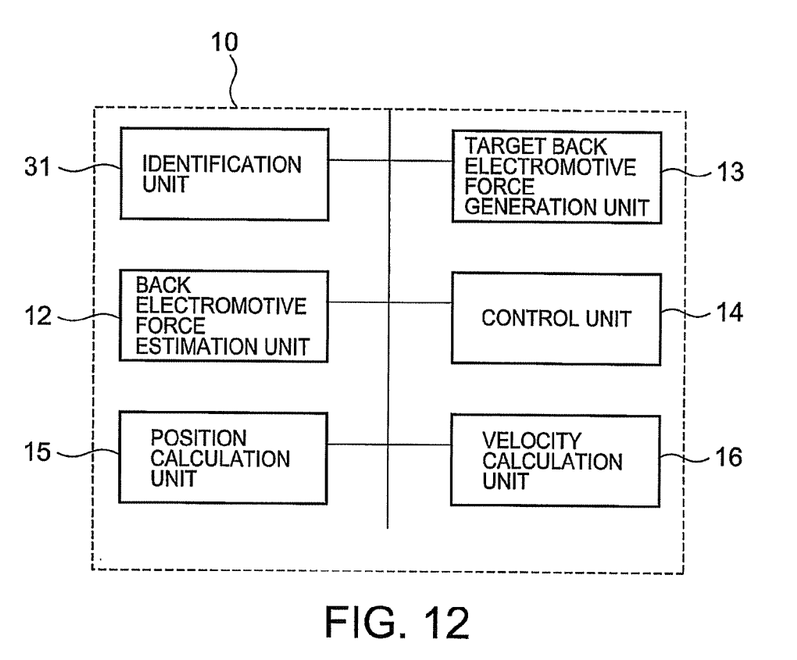
FIG. 12 is a block diagram of a MPU in a hard disk drive according to a third embodiment.

FIG. 12 shows a system component of the MPU 10 according to the third embodiment. In the third embodiment, if a sampling period "$T_s$", a delay "$T_d$" from an input timing to a detection timing, and a constant "a" of LPF, are unknown, the identification unit 31 identifies a gain $G_L$ of inductance, and unknown parameters "$T_s$", "$T_d$" and "a".

Above parameters "$T_s$", "$T_d$" and "a" are included in L(z) of the Eq.14. Accordingly, a transfer function from the command voltage $V_{cmout}$ to a voltage drop quantity $V_{measL}$, of inductance is thought about as follows.

$$G_L \cdot L(z) = \frac{Vmeas_L[i]}{Vcmout[i]} \qquad [\text{Eq. 21}]$$
$$= \frac{Vmeas[i] - G_K Vel[i] - G_R Vcmout[i]}{Vcmout[i]}$$

According to the Eq.21, in case of supplying the command voltage $V_{cmout}$ at a seek timing, the identification unit 31 identifies $G_L \cdot L(z)$ using a velocity signal $V_{el}$ of the head 1 (calculated by the velocity calculation unit 16) and a terminal voltage $V_{meas}$ of a coil (actually detected by the voltage detector 8). Moreover, as to the Eq.21, a gain $G_K$ of a torque constant and a gain $G_R$ of a coil resistance can be identified using a conventional technique (For example, JP-A 2011-28811).

In this case, for example, a discrete-time system used for identification is defined as following Eq.22. The Eq.22 represents a discrete-time model that "$G_L$", "$T_S$", "$T_D$" and "a" are correctly substituted for the Eq.14. Accordingly, as to the Eq.22, the order "n+1" is set as the coefficient "$\alpha_{n+2}$" of the discrete-time model that rough estimated values of "$G_L$", "$T_S$", "$T_D$" and "a" are substituted for the Eq.14 is regarded as very small degree, i.e., ignorable degree.

$$G_L \cdot L(z) = \frac{\alpha_1 z^{n+1} + \alpha_2 z^{n-1} + \alpha_3 z^{n-2} + \ldots + \alpha_n z + \alpha_{n+1}}{z^{n+1}} \qquad [\text{Eq. 22}]$$

In the Eq.21, a value of the right side is calculated as mentioned-above. Under a condition that the value is equal to the left side of the Eq.22, identification is performed. In this case, the least square method or the conventional identification method can be used. Furthermore, in the Eq.22, a degree possibly heightens based on a sampling period. Accordingly, after operation by off-line, $G_L \cdot L(Z)$ may be stored into the memory 9. In order to identify, seek operation may be used. Alternatively, a conventional method for identifying by adding a white signal may be used.

By using $G_L \cdot L(z)$ identified (by the identification unit 31), the back electromotive force unit 12 estimates a back electromotive force $V_{bemf}$ according to the Eq.19.

(Modifications)

Here, according to the Eq.11, an inductance term at a timing "$t = i \cdot T_s$" is represented as following equation.

$$Vmeas_L[i] = G_L \left( \begin{array}{c} e^{-\frac{Td}{n}} \cdot g_0 + e^{-\frac{Td+Ts}{n}} \cdot g_1 + \\ e^{-\frac{Td+2Ts}{n}} \cdot g_2 + \ldots + e^{-\frac{Td+nTs}{n}} \cdot g_n + \ldots \end{array} \right) \quad \text{[Eq. 23]}$$

$$= G_L e^{-\frac{Td}{n}} \cdot g_0 +$$

$$G_L e^{-\frac{Ts}{n}} \left( \begin{array}{c} e^{-\frac{Td}{n}} \cdot g_1 + e^{-\frac{Td+Ts}{n}} \cdot g_2 + \ldots + \\ e^{-\frac{Td+(n-1)Ts}{n}} \cdot g_n + \ldots \end{array} \right)$$

$$= G_L e^{-\frac{Td}{n}} \frac{z-1}{z} Vcmout[i] +$$

$$e^{-\frac{Ts}{n}} Vmeas_L[i-1]$$

$$Vmeas_L[i] = G_L \frac{e^{-\frac{Td}{n}}(z-1)}{z - e^{-\frac{Ts}{n}}} Vcmout[i] \quad \text{[Eq. 24]}$$

By replacing as above-mentioned equation, in place of the discrete-time model of the Eq.14 used for the first and second embodiments, a discrete-time model of the Eq.24 equivalent thereto may be used. Furthermore, in the third embodiment, a following equation that coefficients of the Eq.24 are unknown may be used in place of the Eq.24.

$$Vmeas_L[i] = \frac{\alpha(z-1)}{z-\beta} Vcmout[i] \quad \text{[Eq. 25]}$$

Moreover, if "$T_S$", "$T_D$" and "a" are known as the first and second embodiments, by identifying values of $G_L$, corresponding to a plurality of sampling periods, the values may be stored into the memory 9. In this case, even if the sampling period has changed, by using a value of GL corresponding to the sampling period changed, the back electromotive force can be estimated. Briefly, change of the sampling period can be coped with.

Furthermore, the identification units 11, 21 and 31 (of the first, second and third embodiments respectively) may be used by combining. For example, at the load timing, $G_L$, is identified by the method explained in the first embodiment. At the seek timing, $G_L$ are identified again by the method explained in the second and third embodiments.

As to the first and second embodiments, a gain $G_L$, of inductance of the discrete-time model is only identified. Accordingly, identification can be easily performed. On the other hand, as to the third embodiment, all parameters of the discrete-time model are identified. Accordingly, identification matched with an actual machine can be performed.

By making good use of each merits, as to basic operation, parameters easily identified by method of the first or second embodiments are used. If there is time to spare to perform the third embodiment and if it is necessary to estimate a back electromotive force at a sampling period equal to the present sampling period during operation, parameters are previously identified by method of the third embodiment, and the back electromotive force can be estimated by replacing with the parameters. When a sampling period to estimate a back electromotive force has changed, the back electromotive force can be estimated using parameters identified by method of the first or second embodiments.

Furthermore, the discrete-time model explained in the first, second and third embodiments may not be identified by on-line. In this case, after identifying a discrete-time model at off-line, the discrete-time model is stored into the memory 9. At on-line, parameters of the discrete-time model can be read from the memory 9, and set as fixed values.

As mentioned-above, as to the magnetic disk of at least one of the first, second and third embodiments, even if the inductance has changed, parameter (gain or coefficient) of the discrete-time model are identified. Accordingly, the back electromotive force can be estimated with high accuracy, irrespective of the sampling period.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive comprising:
   a head configured to perform write/read of information to a storage medium;
   a voice coil motor configured to move the head;
   a driving circuit configured to drive the voice coil motor, based on a command signal;
   an identification unit configured to identify at least one parameter of a discrete-time model, the discrete-time model representing a transfer function from the command signal to a voltage drop quantity by an inductance of a coil of the voice coil motor;
   a storage unit configured to store the parameter; and
   an estimation unit configured to estimate a back electromotive force of the coil, based on the discrete-time model including the parameter.

2. The hard disk drive according to claim 1,
   wherein the identification unit cancels a term of a velocity from a relational equation of the voltage drop quantity by setting the velocity of the head to zero before load operation of the head, and identifies the parameter of the inductance in the discrete-time model, based on the relational equation.

3. The hard disk drive according to claim 1, further comprising:
   a position calculation unit configured to calculate a position of the head from servo information of the storage medium; and
   a velocity calculation unit configured to calculate a velocity of the head at the position;
   wherein the identification unit identifies the parameter of the inductance based on the velocity, while the head is operating on the storage medium.

4. The hard disk drive according to claim 2, further comprising:
   a position calculation unit configured to calculate a position of the head from servo information of the storage medium; and
   a velocity calculation unit configured to calculate a velocity of the head at the position;
   wherein the identification unit identifies the parameter of the inductance based on the velocity, while the head is operating on the storage medium.

5. The hard disk drive according to claim 1,
   wherein the identification unit identifies the parameter of the inductance, and parameters represented by a sampling period of the command signal.

6. The hard disk drive according to claim 2,
wherein the identification unit identifies the parameter of the inductance, and parameters represented by a sampling period of the command signal.

7. The hard disk drive according to claim 3,
wherein the identification unit identifies the parameter of the inductance, and parameters represented by a sampling period of the command signal.

8. The hard disk drive according to claim 1,
wherein the identification unit calculates a plurality of parameters each differently corresponding to one of a plurality of sampling periods by off-line, and
wherein the estimation unit selectively uses the parameter corresponding to a sampling period of the command signal.

9. The hard disk drive according to claim 2,
wherein the identification unit calculates a plurality of parameters each differently corresponding to one of a plurality of sampling periods by off-line, and
wherein the estimation unit selectively uses the parameter corresponding to a sampling period of the command signal.

10. The hard disk drive according to claim 1, further comprising:
a generation unit configured to generate a target back electromotive force of the head; and
a control unit configured to control a velocity of the head based on the back electromotive force;
wherein the control unit calculates a difference between the target back electromotive force and the back electromotive force, and controls the velocity of the head along a direction that the difference is equal to zero.

11. The hard disk drive according to claim 2, further comprising:
a generation unit configured to generate a target back electromotive force of the head; and
a control unit configured to control a velocity of the head based on the back electromotive force;
wherein the control unit calculates a difference between the target back electromotive force and the back electromotive force, and controls the velocity of the head along a direction that the difference is equal to zero.

12. A method for estimating a back electromotive force in a hard disk drive, the hard disk drive including a head to perform write/read of information to a storage medium, a voice coil motor to move the head, and a driving circuit to drive the voice coil motor based on a command signal, the method comprising:
identifying at least one parameter of a discrete-time model, the discrete-time model representing a transfer function from the command signal to a voltage drop quantity by an inductance of a coil of the voice coil motor; and
estimating a back electromotive force of the coil, based on the discrete-time model including the parameter.

13. A method for controlling a velocity of a head in a hard disk drive, the hard disk drive including a head to perform write/read of information to a storage medium, a voice coil motor to move the head, and a driving circuit to drive the voice coil motor based on a command signal, the method comprising:
identifying at least one parameter of a discrete-time model, the discrete-time model representing a transfer function from the command signal to a voltage drop quantity by an inductance of a coil of the voice coil motor;
estimating a back electromotive force of the coil, based on the discrete-time model including the parameter;
generating a target back electromotive force of the head;
calculating a difference between the target back electromotive force and the back electromotive force; and
controlling the velocity of the head along a direction that the difference is equal to zero.

* * * * *